United States Patent
LaRue

[15] 3,675,407
[45] July 11, 1972

[54] MACHINE FOR SPLICING TIRE CORD

[72] Inventor: James F. LaRue, Cuyahoga Falls, Ohio
[73] Assignee: The Goodyear Tire & Rubber Company, Akron, Ohio
[22] Filed: Oct. 9, 1970
[21] Appl. No.: 79,433

[52] U.S. Cl. .................................................. 57/22
[51] Int. Cl. ........................................... B65h 69/06
[58] Field of Search .......................... 57/22, 23, 159

[56] References Cited

UNITED STATES PATENTS

| | | | |
|---|---|---|---|
| 2,971,319 | 2/1961 | Spencer | 57/22 |
| 1,523,878 | 1/1925 | Kelly | 57/22 |
| 2,765,003 | 10/1956 | Willis et al. | 57/22 X |
| 3,307,339 | 3/1967 | Porter | 57/22 |
| 3,504,488 | 4/1970 | Illman | 57/22 |

Primary Examiner—John Petrakes
Attorney—F. W. Brunner and Harlan E. Hummer

[57] ABSTRACT

A machine for splicing adjacent ends of textile cords suitable for reinforcing rubberized material used to build pneumatic tires. The machine has a pair of clamps for holding a couple of cord ends in tensioned, adjacent parallel relation, and a ring with a spool of thread for rotating in thread-wrapping relation around the cord ends, after the free end of the thread is knotted to the cord ends intermediate the clamps. The clamps are movable along an axis normal to the plane of the ring when the ring rotates, such that the thread wraps in spiraling relation around the cord ends held between the clamps. The thread extending from the wrapped cord ends is then cut and tied to the cord ends to complete the splice.

20 Claims, 5 Drawing Figures

INVENTOR
JAMES F. LaRue
ATTORNEY

MACHINE FOR SPLICING TIRE CORD

BACKGROUND OF INVENTION

The invention is especially suitable for splicing adjacent ends of tire cord composed of fiberglass, which is difficult material to work with and join, for example, by tying or fusing the ends together. A good splice can be made by wrapping a relatively thin thread of any suitable material, e.g., cotton, spirally around the cord ends for a distance sufficient to maintain the ends together under a predetermined axial load. Adhesive can be applied to the splice to further cement the cord ends together. Such a splice is not easy to make by hand and any hand splices would vary in quality. It is, therefore, desirable to use a machine to wind or wrap the cotton thread spirally around a pair of adjacent tire cord ends, since the wrappings would be generally more uniform, tighter and closer together. It is, therefore, an object of the invention to provide a machine which can suitably join two tire cord ends together, especially tire cords composed of fiberglass material.

Briefly state, the invention is in a machine for splicing tire cord material. The machine comprises a pair of spaced clamps for holding a pair of tire cord ends in parallel relation, and means for tensioning the tire cord ends held by the clamps. A wrapping ring, disposed between the clamps, carries a spool of thread for wrapping around the tire cord ends and splicing them together. Means are provided for simultaneously rotating the ring in thread-wrapping relation around the tire cord ends and causing relative movement between the tire cord ends and ring to spirally wrap the thread around the ends.

DESCRIPTION OF THE DRAWING

The following description of the invention will be better understood by having reference to the annexed drawing, wherein:

FIG. 4 is a clamp of the machine viewed from the line 4—4 of FIG. 1; and

DESCRIPTION OF THE INVENTION

Figure 1:
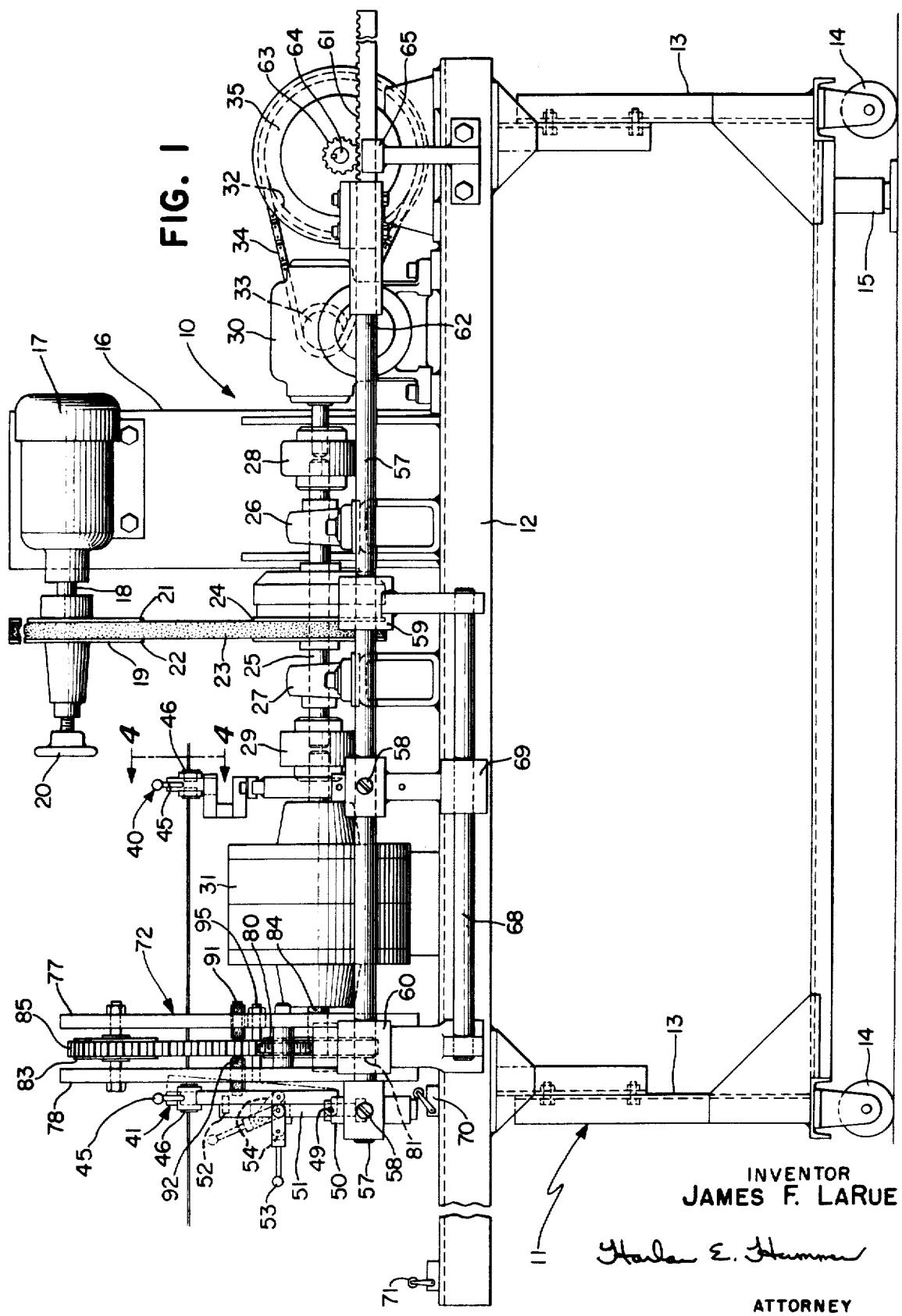
FIG. 1 is a side view of a machine for splicing tire cords.
Figure 2:
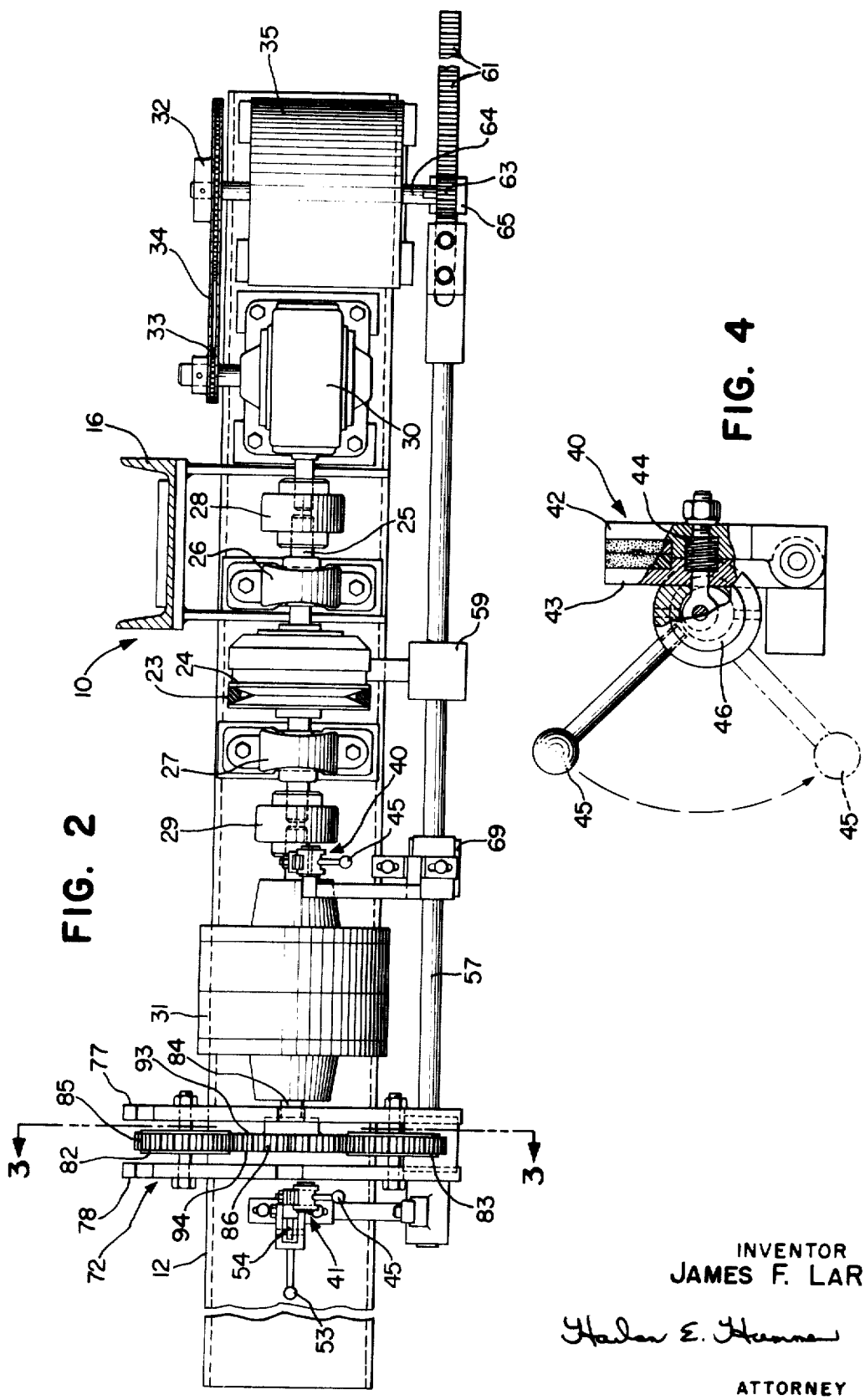
FIG. 2 is a top view of the machine with the operating motor removed.

Referring more particularly to FIGS. 1 and 2 of the drawing, there is shown a machine, generally indicated at 10, for splicing textile cords, especially cords composed of fiberglass, suitable for reinforcing rubberized material used to build pneumatic tires. The machine 10 comprises a stand 11, including a bass 12 mounted on a number of similar legs 13. The legs 13 are adjustable for raising and lowering the base 12 to accommodate an operator in either a sitting or standing position. The machine stand 11 is movable, being mounted on a set of casters 14, and is provided with a conventionally designed floor lock 15 for engaging the floor and holding the machine 10 firmly in position while it is being operated.

GENERAL DRIVE ASSEMBLY.

A motor mount 16 is welded in upstanding relation on the machine base 12. A ¾ horsepower electric motor 17 is secured to the motor mount 16, and has a protruding shaft 18 on which is mounted an adjustable width main drive pulley 19. A hand-operated, rotatable wheel 20 is used for varying the spacing between the opposing truncated sides 21 and 22 of the main drive pulley 19. A flexible belt 23 operatively connects the main drive pulley to a spring-biased drive wheel 24, keyed to a main drive shaft 25, which is journalled for rotation in a pair of spaced pillow blocks 26 and 27 secured to the machine base 12.

A pair of flexible couplings 28 and 29 are provided in the drive chain for connecting the main drive shaft 25 to a speed reducer 30 and combination electric clutch and brake mechanism 31, respectively, which are mounted on the machine base 12 in shaft aligning relation with the main drive shaft 25. The speed reducer 30 is coupled by a pair of aligned sprocket wheels 32 and 33 and connecting chain belt 34, to an electric slip clutch 35. The speed of the electric motor 17, or rotational speed of the main drive shaft 25, is variable by adjusting the belt seating diameter of the main drive pulley 19 and drive wheel 24.

CLAMPING ASSEMBLY.

A set of clamps 40 and 41 are provided and act as a pair of supports for holding a pair of tire cord ends in adjacent, parallel tensioned relation. The tire cord ends held between the clamps 40 and 41 are generally horizontal and parallel to the main drive shaft 25.

Each of the clamps 40 and 41 (FIG. 4) comprises a pair of jaws 42 and 43, which are pivotally mounted for rotation towards and away from each other. A coil spring 44 acts to bias the jaws 42 and 43 in an open position or away from each other to permit placing the tire cords therebetween. A handle 45 is used for operating or rotating an eccentrically mounted cam 46 to close or tighten the jaws 42 and 43 firmly against the tire cords. The position of each pair of clamp jaws 42 and 43 is vertically and horizontally adjustable to properly position the tire cord ends for thread-wrapping relation and splicing.

The clamp 41 is mounted on a pivot pin 49 at the base 50 of an upstanding leg 51, for rotation toward and away from the other opposing clamp 40. A coil spring 52 is provided for biasing the clamp 41 in an angular position in closer spaced relation towards the other clamp 40. A lever 53 and connecting link 54, coupled between the clamp 41 and leg 51, are used for moving the clamp 41 slightly away from the opposing clamp 40 into abutting relation against the upstanding leg 51, to tension the tire cord ends held between the jaws 42 and 43 of the clamps 40 and 41.

The clamps 40 and 41 are secured in spaced relation on a drive rod 57 by any suitable means, e.g., set screws 58. The drive rod 57 is preferably parallel to the main drive shaft 25, and is slidably mounted in a pair of bushings 59 and 60, which are secured in spaced relation to the machine base 12. A gear rack 61 is coupled to the adjacent axially aligned end 62 of the drive rod 57. A pinion or gear 63 is mounted on an adjacent shaft 64 protruding from the electric slip clutch 35. The pinion 63 is in meshing, driving engagement with the upstanding teeth on the gear rack 61. The gear rack 61 is slidably supported in a U-shaped keeper 65 secured to the machine base 12.

A guide rail 68 is secured to the bushings 59 and 60 below, and in parallel relation to the drive rod 57. An extension 69 of the clamp 40 is slidably mounted for movement along the guide rail 68 in response to unitary movement of the clamp 40 and drive rod 57. This particular mechanism helps to stabilize the drive rod 57, which has a slight tendency to rotate.

A pair of conventionally designed sensing mechanisms, e.g., limit switches 70 and 71, are mounted on the machine base 12 for sensing the travel of the clamps 40 and 41 and drive rod 57.

WRAPPING ASSEMBLY.

Figure 3:
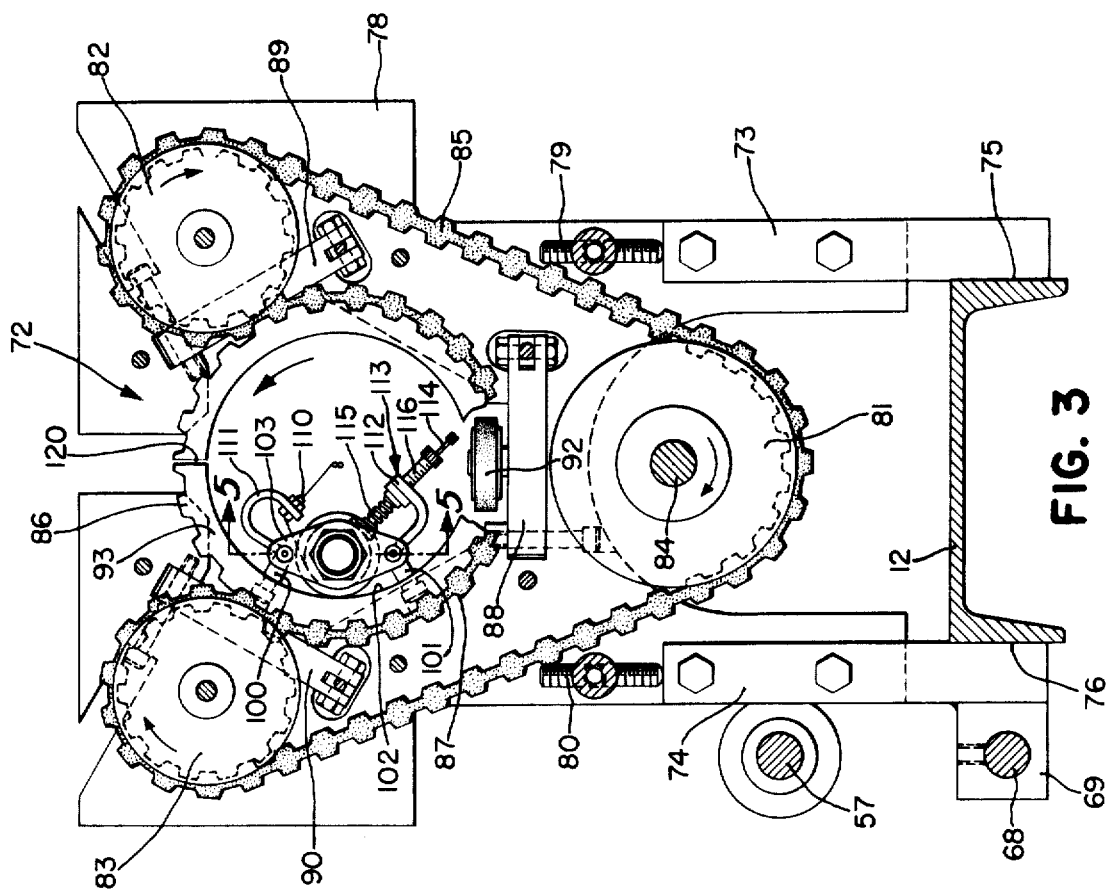
FIG. 3 is a sectional view from the line 3—3 of FIG. 2.

An assembly, generally indicated at 72, is provided for wrapping relatively thin thread of any suitable material, e.g., cotton, in surrounding relation around the adjacent parallel tire cord ends tensioned between the clamps 40 and 41. The wrapping assembly 72 comprises a pair of support arms 73 and 74 (FIG. 3), which are secured in upstanding relation on either side 75 and 76 of the machine base 12. A pair of side plates 77 and 78 (FIGS. 1–2) are adjustably mounted in upstanding relation on the support arms 73 and 74 by any suitable means, e.g., adjusting screws 79 and 80, and form a housing for a set of pulleys 81, 82 and 83, which are disposed in base inverted, triangular spaced relation between the side plates 77 and 78.

The lower pulley 81 acts as the main drive pulley and is keyed to an operating shaft 84 extending from the combination electric brake and clutch mechanism 31. The upper pulleys 82 and 83 are rotatably mounted on the side plates 77 and 78 and act more as guide pulleys for a drive belt 85 with spaced lugs and recesses therebetween, which is reeved around the pulleys 81–83 for rotating them in unison. The drive belt 85 is tensioned on the pulleys 81–83 by rotating the adjusting screws 79 and 80 to move the side plates 77 and 78 vertically in unison in a direction away from a machine base 12.

A toothed wrapping ring 86 is freely disposed in a cradle 87 formed by the lugged drive belt 85 between the upper guide pulleys 82 and 83. The teeth of the wrapping ring 86 and the lugs of the drive belt 85 are in meshing engagement, such that the drive belt 85 will drive or rotate the wrapping ring 86. The upper guide pulleys 82 and 83 slightly overhang and compressibly engage the wrapping ring 86 to maintain it within the cradle 87 of the drive belt 85. It should be apparent from the drawing that the lugged belt 85 and upper pulleys 82 and 83 coact to maintain the ring 86 rotating about a fixed axis passing through the center point of the ring 86 in transverse relation to the plane of the ring 86.

A number of arcuately spaced guides 88, 89, and 90 (FIG. 3) engage and keep the wrapping ring rotating in a plane, which is preferably normal to the main drive shaft 25. Each of the guides 88–90 comprises a pair of oppositely disposed rollers 91 and 92 (FIG. 1), which compressively and rotatably engage opposing sides 93 and 94 of the wrapping ring 86. The roller portion actually engaging the wrapping ring 86 is preferably composed of plastic. Each of the guide rollers 91 and 92 is laterally adjustable relative to the wrapping ring 86 by any suitable means, e.g., adjusting screws and nuts indicated at 95 (FIG. 1).

Figure 5:
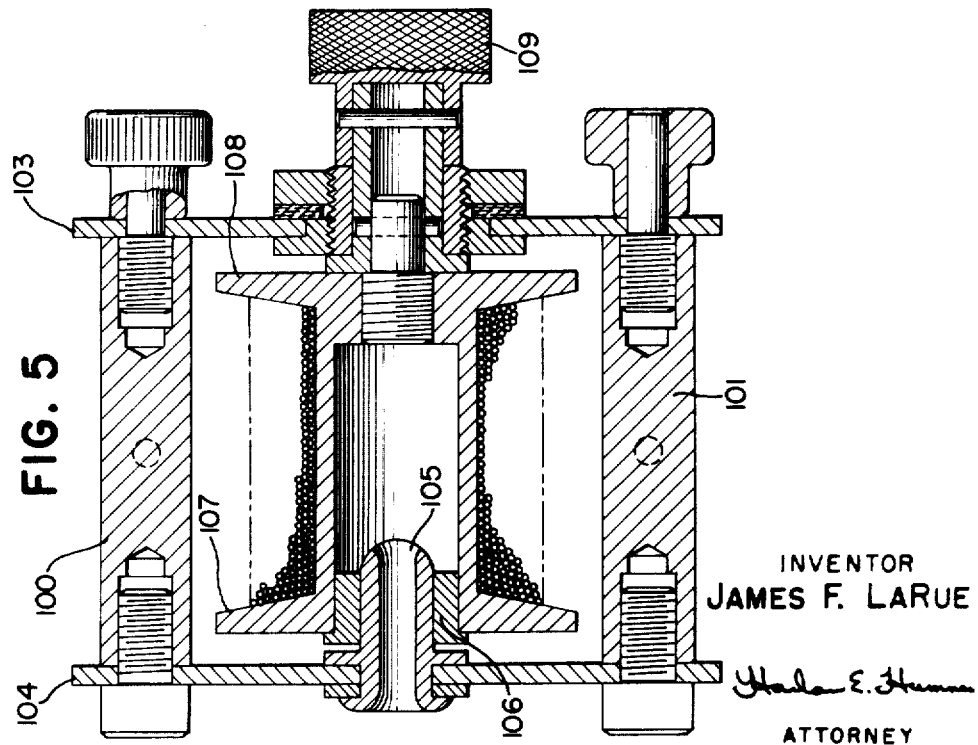
FIG. 5 is a sectional view from the line 5—5 of FIG. 3.

A pair of T-shaped brackets 100 and 101 (FIGS. 3 and 5) project in parallel relation from the inner periphery 102 of the wrapping ring 86. A pair of cover plates 103 and 104 are treadably mounted in parallel relation on the T-brackets 100 and 101. A centrally disposed spindle 105 extends from the cover plate 104 for receiving an adjacent end 106 of a spool 107 of thread used to wrap around the tire cords. The opposing end 108 of the spool 107 of thread is threadably engaged by a rotatable knob 109 fastened to the other cover plate 103. The cover plate 103, spool 107, and knob 109 are removed as an assembly for quick replacement of a depleted spool of thread. The free end of the thread is taken from the spool 107 and passed through an eyelet 110 of a configured arm 111 extending from the T-bracket 100. A support arm 112 extends from the other T-bracket 101, and holds a mechanism, generally indicated at 113, for tensioning thread leaving the spool 107.

The tensioning mechanism 113 comprises a plunger 114, which is biased against thread on the spool 107 by any suitable means, e.g., coil spring 115. A screw 116, surrounding the plunger 114, is threadably adjustable on the support arm 112 for varying the spring tension and consequent force the plunger 114 exerts against the thread wrapped on the spool 107.

OPERATION OF THE SPLICING MACHINE.

THe electric motor 17 and the electric clutches 31 and 35 are in separate electrical circuits with an outside source of power and conventionally designed pushbutton switches. Thus, the electric motor 17 can be operated while the slip clutches 31 and 35 are disengaged to prevent operation of the wrapping ring 86 and movement of the gear rack 61. Assuming this is the case, adjacent ends of two tire cords to be spliced, are placed in parallel side-by-side relation between the clamps 40 and 41. The jaws 42 and 43 of the clamps 40 and 41 are tightened to secure the tire cord firmly in the clamps. The lever 53 is then rotated to tension the tire cords between the clamps 40 and 41. A slot or groove 120, extending transversely through the wrapping ring 86, is provided to facilitate moving the tire cords through the wrapping ring 86 for placement in the clamps 40 and 41. The free end of the wrapping thread extending from the eyelet 110, is knotted or tied around the tire cords at a point where it is desired to begin the splice.

The slip clutch 35 is disengaged and, therefore, the drive rod 57 can be moved axially to laterally position the clamps 40 and 41 in relation to the wrapping ring 86. In this manner, the length of the splice can be varied. Moreover, it is preferable that the wrapping thread from the eyelet 110 be normal to the tire cord. However, it is difficult to knot the thread around the tire cords in the vicinity of the wrapping ring 86 and side plates 77 and 78. Therefore, the clamps 40 and 41 are generally moved to one side, such that the beginning of the splice or point of knotting the thread around the tire cords is outside the wrapping ring housing or side plates 77 and 78.

This means that after tying the knot, the drive rod 57 must be moved to reposition the clamps 40 and 41 such that the wrapping thread is normal to the tire cords. It should be appreciated that considerable slack in the thread develops between the eyelet and tire cords when the knot is made. The slack is taken up by rotating the knob 109 which, in turn, rotates the spool 107 of thread to remove the slack in the thread and tension it. The machine 10 is now ready to operate and form the splice by spirally wrapping the thread around the tire cords.

A second manually operated switch is pressed to engage the clutches 31 and 35 and place the main drive shaft 25 in driving relation with the shafts 64 and 84 controlling operation of the drive rod 57 and wrapping ring 86. Simultaneously, the drive rod 57 moves axially to the left (FIG. 1) and the wrapping ring 86 begins rotating. The clamps 40 and 41 and tire cords held therebetween, are correspondingly moved and the thread is wrapped in spiral relation around the tire cords until the clamp 41 engages the limit switch 71, which acts to break the electrical circuit to the slip clutches 31 and 35, thereby stopping operation of the wrapping ring 86 and movement of the gear rack 61 and drive rod 57. The wrapping thread adjacent the eyelet 110 is then severed and knotted around the tire cords to complete the splice. An adhesive or cement can be applied to the wrapping for increasing the strength of the splice.

The number of spiral turns of the wrapping thread per inch can be changed by varying the axial speed or movement of the drive rod 57. This is most conveniently accomplished by changing the size of the sprocket wheels 32 and 33 associated with the clutch 35 and speed reducer 30.

The clamps 40 and 41 can be returned manually to their normal position as shown in FIG. 1, since the clutch 35 is disengaged. Moreover, the wrapping ring 86 can be rotated to a position where the slot 120 is in an uppermost position, because the other clutch 31 is also disengaged. The limit switch 70 is provided to stop travel of the drive rod 57 and prevent damage to the machine if, for example, reverse polarization occurs and causes the electric motor 17 to reverse and move the drive rod 57 in a normally opposite direction, such that the clamp 41 strikes the adjacent side plate 78 or hits the rotating wrapping ring 86.

Thus, there has been described a new and novel machine for splicing adjacent ends of tire cords by wrapping relatively thin thread around the cords a predetermined length to hold the cords firmly together in splicing engagement.

While certain representative embodiments and details have been shown for the purpose of illustrating the invention, it will be apparent to those skilled in the art that various changes and modifications may be made therein without departing from the spirit or scope of the invention.

What is claimed is:

1. A machine for splicing tire cords, comprising:
  a. a pair of spaced supports;
  b. means for clamping a pair of tire cord ends in tensioned relation between the supports;

c. a mechanism disposed between the supports for holding thread used for wrapping around and holding the tire cord ends together in spliced relation;
d. means for rotating the mechanism in thread-wrapping relation around the tire cord ends clamped between the supports;
e. means for causing relative movement between the mechanism and tire cord ends to spirally wrap the thread around the ends; and
f. means for changing the speed at which the supports move along said axis to correspondingly change the number of spiral wrappings per unit of cord length measured axially along the tire cord ends clamped in the supports.

2. The machine of claim 1, wherein the means (e) includes means for causing relative movement between the supports and mechanism.

3. The machine of claim 2, which includes means for moving the supports in unison along an axis normal to a fixed plane in which the mechanism rotates.

4. The machine of claim 3, wherein the mechanism includes:
g. a ring disposed in surrounding relation around the tire cord ends clamped between the supports;
h. a slot extending transversely through the rings; and
i. means for mounting a spool of thread on the ring.

5. The machine of claim 4, wherein the thread mounting means (i) includes means for tensioning thread leaving the spool.

6. A machine for splicing tire cords, comprising:
a. a pair of spaced supports;
b. means for clamping a pair of tire cord ends in tensioned relation between the supports, said means including a pair of clamp jaws carried by each support for engaging and holding the tire cord ends therebetween, and means for moving at least one pair of clamp jaws in a direction away from the other pair of clamp jaws for tensioning the tire cord ends;
c. a mechanism disposed between the supports for holding thread used for wrapping around and holding the tire cord ends together in spliced relation, said mechanism including:
   1. a ring disposed in surrounding relation around the tire cord ends clamped between the supports;
   2. a slot extending transversely through the rings; and
   3. means for mounting a spool of thread on the ring, said spool mounting means including means for tensioning thread leaving the spool;
d. means for rotating the mechanism in thread-wrapping relation around the tire cord ends clamped between the supports; and
e. means for causing relative movement between the mechanism and tire cord ends to spirally wrap the thread around the ends.

7. The machine of claim 6, wherein the rotating means (d) includes:
i. means for supporting the ring for rotation about a fixed axis, said means including a drive belt reeved in supporting and guiding relation at least partially around the ring.

8. The machine of claim 7, wherein the movement causing means (e) includes:
j. means for moving the supports laterally in unison relative to the ring.

9. The machine of claim 8, wherein the support moving means (j) includes:
k. means for guiding the supports along a common axis normal to the plane of the ring; and
m. means for varying the spacing between the supports.

10. The machine of claim 9, wherein the support guiding means (k) includes a drive rod, a gear rack coupled to the drive rod, and a rotatable pinion for meshing, driving engagement with the gear rack.

11. The machine of claim 10, which includes a common drive mechanism for moving the drive belt and pinion, and means for allowing slippage between the drive mechanism and pinion to vary the lateral position of the supports relative to the ring and consequent axial length of the wrapping around the tire cord ends.

12. A machine for splicing tire cords, comprising:
a. a pair of spaced clamps for supporting a pair of tire cord ends in adjacent, parallel relation therebetween, each clamp including a pair of jaws for grasping the cord ends;
b. means for tensioning the tire cord ends held between the clamps;
c. means for mounting the clamps for unitary axial movement;
d. means for varying the spacing between the clamps;
e. a set of three pulleys disposed in base inverted triangular relation between the clamps and being in a plane normal to the axis along which the clamps move;
f. a belt reeved around the pulleys and forming a cradle therebetween;
g. a wrapping ring disposed in the cradle and rotatable in the plane of the pulleys in response to movement of the belt;
h. means for maintaining the ring seated against the cradle in engaged relation with the belt as the ring rotates;
i. means for guiding the ring to keep it rotating in the plane of the pulley;
j. means for mounting a spool of wrapping thread on the ring;
k. means for tensioning thread as it leaves the spool; and
m. means for simultaneously moving the clamps axially in unison and rotating the ring such that thread wraps spirally around the tire cord ends.

13. The machine of claim 12, wherein the means (h) includes mounting the upper pair of triangularly mounted pulleys in closer spaced relation than the overall diameter of the wrapping ring.

14. The machine of claim 13, which includes:
n. means for adjusting the tension in the belt.

15. The machine of claim 14, wherein the means (i) includes arcuately spaced pairs of spaced rollers for engaging opposing sides of the ring, and means for varying the spacing between each pair of spaced rollers.

16. The machine of claim 15, wherein the means (m) includes:
o. a main drive shaft rotatable to drive the belt and a drive rod coupled to the clamps; and
p. means interposed between the belt and drive rod and main drive shaft for disengaging the belt and drive rod from the main drive shaft and out of driven engagement therewith.

17. The machine of claim 16, which includes:
q. means for adjusting the lateral position of the clamps relative to the wrapping ring.

18. The machine of claim 17, which includes a slot disposed transversely through the wrapping ring.

19. The machine of claim 18, which includes means for vertically and horizontally adjusting each clamp relative to an axis, which passes through the center point of the ring and is normal to the plane of the ring.

20. The machine of claim 19, which includes means for changing the speed at which the clamps move axially in unison, to correspondingly change the number of spiral wrappings per unit of cord length measured axially along the tire cord ends clamped in the supports.

* * * * *